(12) United States Patent
Kumahashi

(10) Patent No.: US 12,355,607 B2
(45) Date of Patent: Jul. 8, 2025

(54) INFORMATION PROCESSING SYSTEM, IMAGE FORMING APPARATUS AND METHOD OF CONTROLLING THE SAME, AND STORAGE MEDIUM

(71) Applicant: CANON KABUSHIKI KAISHA, Tokyo (JP)

(72) Inventor: Shu Kumahashi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 18/301,492

(22) Filed: Apr. 17, 2023

(65) Prior Publication Data
US 2023/0362049 A1 Nov. 9, 2023

(30) Foreign Application Priority Data
May 9, 2022 (JP) .................................. 2022-077178

(51) Int. Cl.
*H04L 41/0273* (2022.01)
*H04L 41/0816* (2022.01)
*H04L 41/5009* (2022.01)
*H04N 1/00* (2006.01)

(52) U.S. Cl.
CPC ...... *H04L 41/0286* (2013.01); *H04L 41/0816* (2013.01); *H04L 41/5009* (2013.01); *H04N 1/00244* (2013.01); *H04N 1/00347* (2013.01); *H04N 2201/0094* (2013.01); *Y02D 10/00* (2018.01)

(58) Field of Classification Search
CPC ............. H04L 41/0286; H04L 41/0816; H04L 41/5009; H04N 1/00244; H04N 1/00347; H04N 2201/0094; Y02D 10/00
See application file for complete search history.

(56) References Cited

U.S. PATENT DOCUMENTS

| | | | | |
|---|---|---|---|---|
| 2010/0165392 A1* | 7/2010 | Yabe | .................. | H04N 1/00464 710/33 |
| 2020/0267009 A1* | 8/2020 | Watanabe | ............... | H04L 43/16 |
| 2020/0366799 A1* | 11/2020 | Tokunaga | .......... | H04N 1/00214 |
| 2020/0382657 A1* | 12/2020 | Watariuchi | ......... | H04N 1/00464 |
| 2022/0279046 A1* | 9/2022 | Perng | .................. | H04L 67/2866 |
| 2022/0413774 A1* | 12/2022 | Kawano | ................ | G06F 3/1293 |
| 2023/0231954 A1* | 7/2023 | Osajima | ............. | H04N 1/00344 358/1.15 |

FOREIGN PATENT DOCUMENTS

JP 2021128738 A 9/2021

* cited by examiner

*Primary Examiner* — Thomas J Dailey
(74) *Attorney, Agent, or Firm* — ROSSI, KIMMS & McDOWELL LLP

(57) ABSTRACT

An information processing system including an image forming apparatus provided with an output function for outputting operating information to a management server and an information processing apparatus capable of operating as a proxy of the output function is provide. The image forming apparatus provides a predetermined web service, and accepts a request for setting the proxy of the output function via the predetermined web service. The information processing apparatus transmits a request for setting a proxy for making use of the information processing apparatus as a proxy for the output function to the image forming apparatus providing the predetermined web service among apparatuses on a network.

15 Claims, 13 Drawing Sheets

FIG. 4A

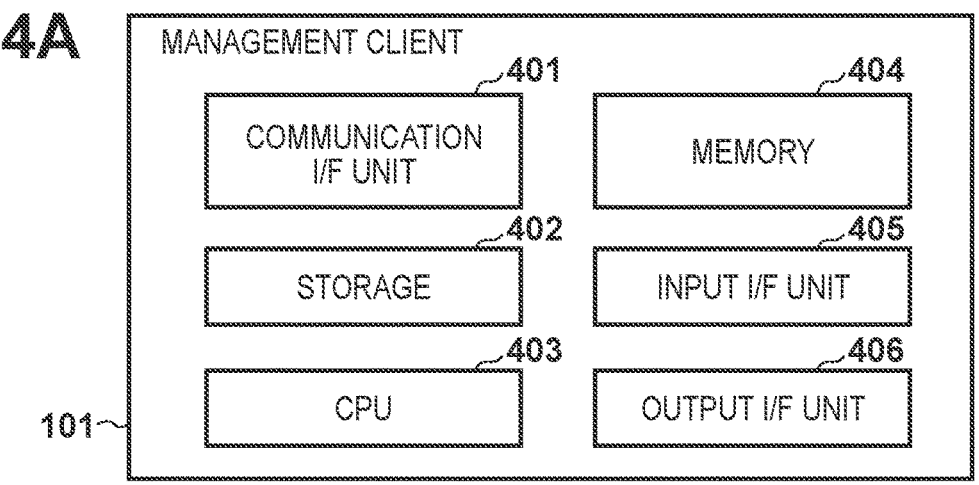

| 501 | 502 | 503 | 504 |
|---|---|---|---|
| SERVICE NAME | SERVICE STATUS | SERVICE PATH | SERVICE NOTIFYING DESTINATION |
| REMOTE UI | ENABLED | - | xxx |
| REMOTE MONITORING | ENABLED | remote_monitor | yyy |

FIG. 5B

| 510 | 511 | 512 |
|---|---|---|
| FUNCTION | FUNCTION PATH | METHOD |
| PROXY SETTING | setting_proxy | PUT/DELETE |
| SERVICE REGISTRATION/ REGISTRATION CANCELLATION | activate | PUT/DELETE |
| SERVICE REGISTRATION INFORMATION OBTAINMENT | registration_info | GET |

| DEVICE ID | SERIAL NUMBER | IP ADDRESS |
|---|---|---|
| 00000001 | AAA11 | 11.11.11.11 |
| 00000002 | AAA22 | 22.22.22.22 |

FIG. 14A

| | | |
|---|---|---|
| 🛎 | SET REMOTE MONITORING SERVICE | |
| 1401 | REGISTERING STATUS | : NOT REGISTERED |
| 1402 | WEB SERVICE SETTING | : ENABLED |

FIG. 14B

DEVICE MANAGEMENT

| 1404 | 1405 |
|---|---|
| SET PROXY IN ONE BATCH | REGISTER IN ONE BATCH |

| SERIAL NUMBER (1410) | IP ADDRESS (1411) | REGISTERING STATUS (1412) | PROXY SETTING (1413) |
|---|---|---|---|
| AAA11 | 11.11.11.11 | REGISTERED | ALREADY SET |
| AAA22 | 22.22.22.22 | NOT REGISTERED | NOT SET |

INFORMATION PROCESSING SYSTEM, IMAGE FORMING APPARATUS AND METHOD OF CONTROLLING THE SAME, AND STORAGE MEDIUM

BACKGROUND OF THE INVENTION

Field of the Invention

The present invention relates to an information processing system, an image forming apparatus and a method of controlling the same, and a storage medium.

Description of the Related Art

A remote monitoring system for performing maintenance of devices (such as image forming apparatuses) installed in an office or the like via a network is known. By using such a remote monitoring system, it is possible to quickly detect and respond to, for example, occurrence of failure in devices, a need for replenishing consumables, and the like, via a network.

When there are a plurality of devices to be managed in an office, it is easier for a system administrator of the office to manage the devices if communication paths for when the devices communicate with a management server for remote monitoring are aggregated. For example, as described in Japanese Patent Laid-Open No. 2021-128738, a technique for installing a management client in a LAN of an office and setting the management client itself to be a proxy for communication between devices and a management server is known. This makes it such that when a device performs communication for remote monitoring, the communication always passes through the management client.

However, although the aforementioned Japanese Patent Laid-Open No. 2021-128738 describes that the management client sets a proxy in an image forming apparatus, it does not describe how the proxy is set in the image forming apparatus.

SUMMARY OF THE INVENTION

Embodiments of the present disclosure eliminate the above-mentioned issues with conventional technology.

A feature of embodiments of the present disclosure is to provide a technique for allowing an information processing apparatus to set a proxy for a predetermined web service provided by an image forming apparatus in the image forming apparatus.

According to embodiments of the present disclosure, there is provided an information processing system including an image forming apparatus provided with an output function for outputting operating information to a management server and an information processing apparatus capable of operating as a proxy of the output function,
the image forming apparatus comprising:
one or more first memories storing instructions; and
one or more first processors that execute the instructions to:
provide a predetermined web service; and
accept a request for setting the proxy of the output function via the predetermined web service, and
the information processing apparatus comprising:
one or more second memories storing instructions; and
one or more second processors that execute the instructions to:
transmit a request for setting a proxy for making use of the information processing apparatus as a proxy for the output function to the image forming apparatus providing the predetermined web service among apparatuses on a network.

According to embodiments of the present disclosure, there is provided an information processing system including a plurality of image forming apparatuses provided with an output function for outputting operating information to a management server,
a first image forming apparatus of the plurality of image forming apparatuses comprising:
one or more memories storing instructions; and
one or more processors that execute the instructions to:
provide a predetermined web service;
accept a request for setting a proxy of the output function via the predetermined web service; and
transmit a request for setting a proxy for making use of the first image forming apparatus as a proxy of the output function to a second image forming apparatus of the plurality of image forming apparatuses.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 4A is a block diagram for describing a hardware configuration of the management client according to the first embodiment.

FIG. 4B is a functional block diagram for describing a software configuration of the management client according to the first embodiment.

FIG. 5A is a conceptual diagram of a table for managing web services provided to devices on a LAN by the image forming apparatus according to the first embodiment.

FIG. 5B is a conceptual diagram of a table for managing functions provided by a remote monitoring I/F in a web service.

FIG. 14A is a diagram illustrating an example of a remote monitoring service setting screen of the image forming apparatus according to an embodiment.

FIG. 14B is a diagram illustrating an example of a device management screen of the management client according to the third embodiment.

DESCRIPTION OF THE EMBODIMENTS

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure.

First Embodiment

A first embodiment of the present invention will be described.

Figure 1:
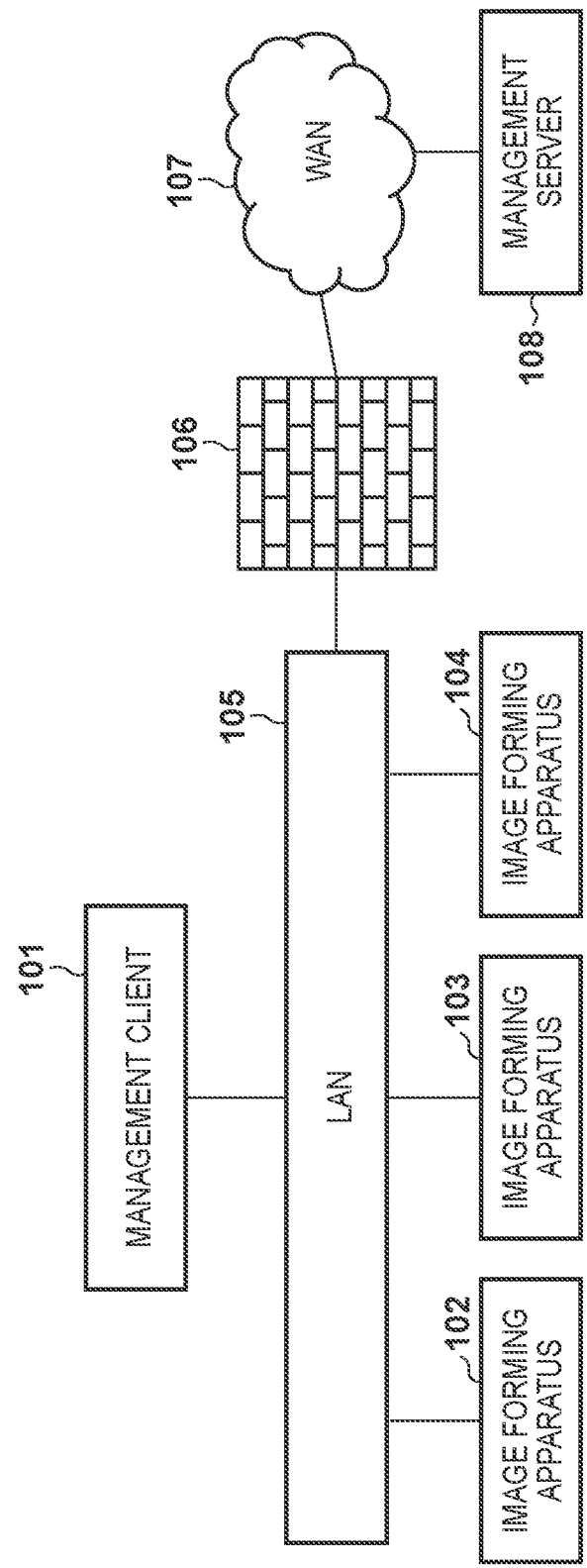
FIG. 1 is a configuration diagram of an information processing system including a management client, a plurality of image forming apparatuses, and a management server according to each embodiment of the present invention and for managing each of the image forming apparatuses.

FIG. 1 is a configuration diagram of an information processing system including a management client, a plurality of image forming apparatuses, and a management server according to each embodiment of the present invention and for managing each of the image forming apparatuses. In the information processing system according to the embodiment, a management client 101 and image forming apparatuses 102 to 104, which are one or more network devices, are connected to a local area network (LAN) 105. A management server 108 is connected to a wide area network (WAN) 107, and the LAN 105 and the WAN 107 are connected via a firewall 106. Unless otherwise specified, assume that the image forming apparatus 102, the image forming apparatus 103, and the image forming apparatus 104 have similar configurations.

The management client 101 corresponds to an information processing apparatus according to the embodiment. By performing proxy setting, which will be described later, in advance, the management client 101 can operate as a proxy for an image forming apparatus connected to the LAN 105 when the image forming apparatus transmits operating information to the management server 108.

Figure 2:
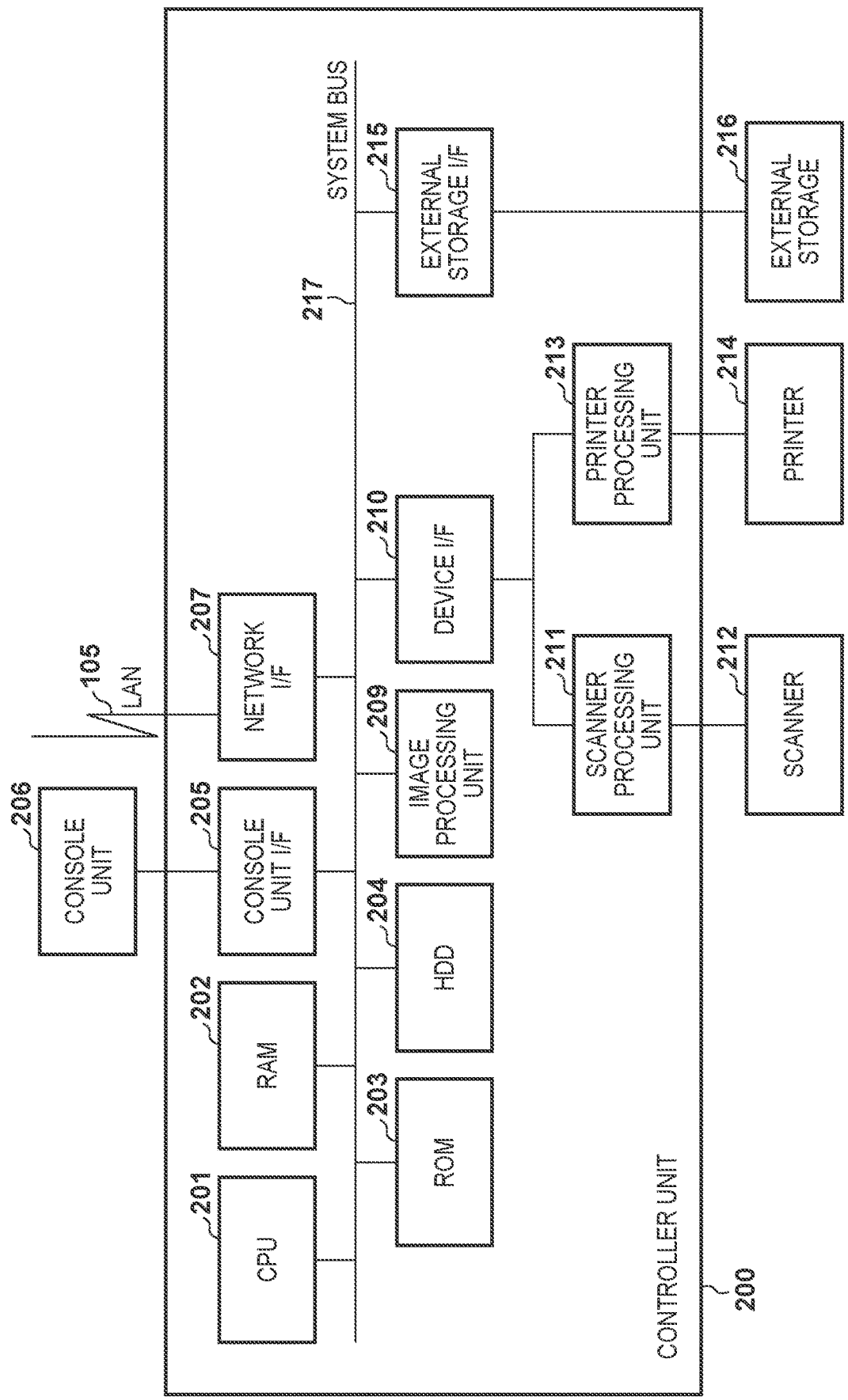
FIG. 2 is a block diagram for describing a hardware configuration of an image forming apparatus according to a first embodiment.

FIG. 2 is a block diagram for describing a hardware configuration of an image forming apparatus according to the first embodiment. In the first embodiment, the image forming apparatus 102 is realized as a so-called multifunction peripheral (MFP) in which a plurality of functions, such as a scanning function and a printing function, are integrated. In the present embodiment, a description will be given using the image forming apparatus 102 as an example, assuming that the image forming apparatuses 103 and 104 have similar configurations.

The image forming apparatus 102 includes a controller unit (control unit) 200 for controlling the entire apparatus, a console unit 206, a scanner 212, and a printer 214. The console unit 206 includes a numeric keypad, various physical keys, and the like for receiving input of an instruction, such as job execution, from a user, and also includes a display panel for displaying device information, job progress information, a screen for setting functions executable by the image forming apparatus 102, or the like to the user. The scanner 212 is an image input device for optically reading an image on a set document. The printer 214 is an image output device for printing an image on a printing medium, such as paper, based on image data.

The console unit 206 is connected to a console unit interface (I/F) 205 included in the controller unit 200. The scanner 212 and the printer 214 are connected to a scanner processing unit 211 and a printer processing unit 213, respectively, included in the controller unit 200. With this configuration, the console unit 206, the scanner 212, and the printer 214 each operate by being controlled by the controller unit 200. Further, an external storage 216, such as a USB memory medium, can be connected as necessary to the image forming apparatus 102. At this time, the external storage 216 is connected via an external storage I/F 215 and operates according to the control of the controller unit 200.

The controller unit 200 includes a CPU 201 for comprehensively controlling each of the blocks of the controller unit 200. The CPU 201 is connected to a RAM 202, a ROM 203, a hard disk drive (HDD) 204, the console unit I/F 205, a network I/F 207, and an image processing unit 209, a device I/F 210, and the external storage I/F 215 via a system bus 217. The RAM 202 is a general-purpose RAM and is a memory for providing a working region of the CPU 201. The RAM 202 is also used as a memory for temporarily storing parameters, setting values, and the like and an image memory for storing image data in predetermined units, such as pages. The ROM 203 is a general-purpose ROM and, for example, stores a system boot program as a boot ROM. The HDD 204 stores a system program, history data, tables, and the like. A function of the image forming apparatus 102 is realized, for example, by the CPU 201 executing a program stored in the ROM 203 or the HDD 204 by deploying the program in the RAM 202. The console unit I/F 205 is an interface for inputting and outputting information to and from the console unit 206. The console unit I/F 205 outputs display data to the console unit 206 according to an instruction from the CPU 201 and transmits information inputted by the user using the console unit 206 to the CPU 201.

The network I/F 207 is connected to the LAN 105, which is a wired or wireless medium, and allows input and output of information between the image forming apparatus 102 and devices on the LAN 105. The network I/F 207 has a configuration supporting the LAN 105 and may, for example, have a configuration supporting near-field communication in which a wireless distance is about several ten centimeters. In that case, communication is performed with a mobile wireless terminal.

The image processing unit 209 executes general-purpose image processing. For example, the image processing unit 209 executes processing, such as enlargement/reduction, rotation, and conversion, on image data obtained externally via the LAN 105. The image processing unit 209 executes processing for rendering PDL code received via the LAN 105 into a bitmap image. When printing is performed by the printer 214 via the printer processing unit 213, the image processing unit 209 executes processing for converting compressed/encoded image data stored in the RAM 202 into a format that can be processed by the printer processing unit 213. The device I/F 210 is connected to the scanner 212 and the printer 214 via the scanner processing unit 211 and the printer processing unit 213 and performs synchronous/asynchronous conversion of image data and transmission of setting values, adjustment values, and the like. The device I/F 210 also transmits status information from the scanner 212 and the printer 214 to the CPU 201. The status information includes, for example, error information, such as occurrence of a jam in the scanner 212 or the printer 214.

The scanner processing unit 211 performs various kinds of processing corresponding to a scanning function, such as correction, processing, image area separation, scaling, and binarization processing on read data, which has been read and inputted by the scanner 212. The scanner 212 includes an auto document feeder (ADF) and a platen reading apparatus (not illustrated) and can perform reading of a document placed on a document glass platform, two-sided reading of a plurality of documents, and the like. In addition, sensors for detecting opening and closing of a cover of a feeding apparatus (not illustrated), opening and closing of a document cover (not illustrated), presence or absence of a document, a size of a document, and the like are provided in the scanner 212. Detection signals from the sensors and status information of the scanner 212 are transmitted to the CPU 201 via the scanner processing unit 211 and the device I/F 210, and the CPU 201 recognizes a status of the scanner 212, such as occurrence of an error or resolving of an error.

The printer processing unit 213 performs processing corresponding to a printing function, such as output correction corresponding to output characteristics of the printer 214, resolution conversion, and adjustment of a printing position of an image, on image data to be printed out. The printer 214 includes one or more paper feeding cassettes (not illustrated) for storing printing media (sheets), one or more toner trays (not illustrated) for storing toner, and a paper feeding unit (not illustrated) capable of sequentially feeding printing media, such as sheets or papers, one sheet at a time from a paper feeding cassette. The printer 214 further includes a marking unit (not illustrated) for performing printing on fed paper using toner and a fixing unit (not illustrated) for fixing toner printed by the marking unit using heat and pressure. Sensors for detecting an opening and closing status and a remaining amount of papers of each of the paper feeding cassettes, opening and closing statuses of the toner trays, opening and closing of the cover of the paper feeding unit (not illustrated), presence or absence of toner, and a position of a printing medium, such as paper, being fed, and the like are provided in the printer 214. Detection signals from the sensors and status information of the printer 214 are transmitted to the CPU 201 via the printer processing unit 213 and the device I/F 210, and the CPU 201 recognizes a status of the printer 214, such as occurrence of an error or resolution of an error.

When the external storage 216 is connected, the external storage I/F 215 reads data stored in the external storage 216 or writes data to the external storage 216 according to an instruction from the CPU 201.

Figure 3:
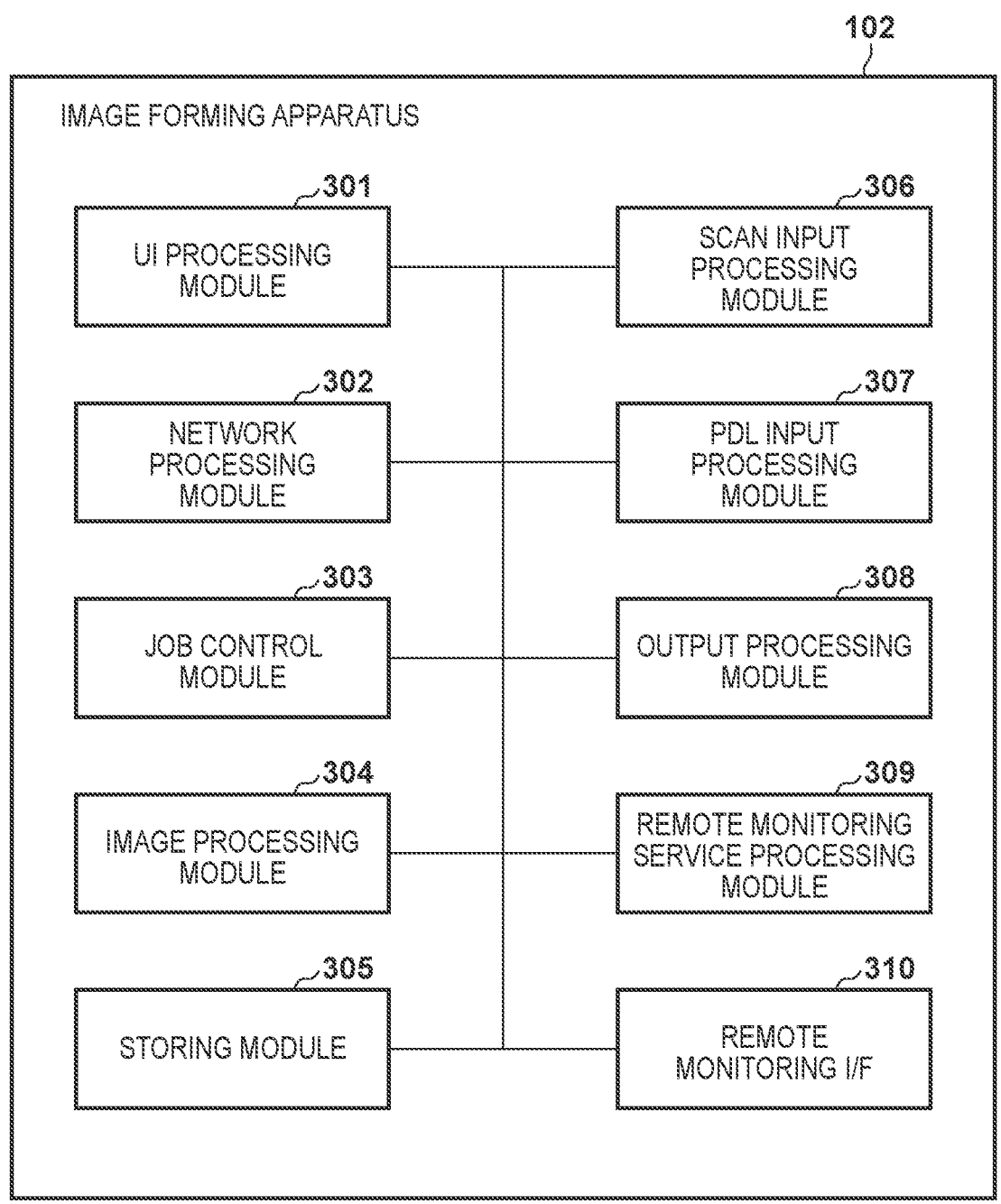
FIG. 3 is a functional block diagram for describing software modules of the image forming apparatus according to the first embodiment.

FIG. 3 is a functional block diagram for describing software modules of the image forming apparatus 102 according to the first embodiment. Functions of the modules of FIG. 3 are realized by the CPU 201 of the image forming apparatus 102 executing a program deployed in the RAM 202.

A user interface (UI) processing module 301 performs processing related to the console unit I/F 205 and the console unit 206. The UI processing module 301 notifies as necessary another module of an operation performed by the user on the console unit 206 and displays a screen on the console unit 206 according to an instruction from that other module. The UI processing module 301 performs editing of graphics data for causing the console unit 206 to perform display, and the like.

A network processing module 302 performs processing for communicating with devices on the LAN 105 via the network I/F 207. When receiving a control command and data from a device on the LAN 105, the network processing module 302 notifies another module of this information. The network processing module 302 also transmits a control command and data to a device on the LAN 105 according to an instruction from another module. The network processing module 302 also serves a role of providing web services, which will be described later.

A job control module 303 controls other modules and comprehensively controls execution of each of the jobs occurring in the image forming apparatus 102, such as copying, printing, and faxing. When a job is inputted from the UI processing module 301 or the network processing module 302, the job control module 303 determines a type of the job and instructs an input processing module suitable for that type to execute processing for generating image data for printing. For example, when a copy job is inputted, the job control module 303 issues an execution instruction to a scan input processing module 306, and when a PDL job is inputted, the job control module 303 issues an execution instruction to a page description language (PDL) input processing module 307. The input processing modules 306 and 307 generate image data for each page and notify the job control module 303 that the image data is stored in a storing module 305. Upon receiving that notification, the job control module 303 instructs an output processing module 308 to execute processing for performing printing on a printing medium based on that image data. Printing of images is realized by repeating this series of control for the number of pages of the job.

An image processing module 304 performs processing related to the image processing unit 209 of FIG. 1. The image processing module 304 performs image processing by software or image processing by hardware in which the image processing unit 209 is used according to an instruction from each of the input processing modules 306 and 307 and the output processing module 308. The image processing module 304 also performs image segmentation and handwriting determination in a second embodiment, which will be described later.

The storing module 305 reads data from and writes data to the RAM 202 and the HDD 204. The storing module 305 stores various kinds of data according to instructions from other modules.

The scan input processing module 306 performs processing for reading a document set in the scanner 212 by controlling the scanner processing unit 211 and the scanner 212 according to an instruction from the job control module 303. The scan input processing module 306 performs image processing on image data obtained by reading the document by controlling the scanner processing unit 211. The scan input processing module 306 also obtains status information of the scanner processing unit 211 and the scanner 212 and notifies the job control module 303 of the status information. In addition, when a processing interrupt instruction, which will be described later, is received from the job control module 303, the scan input processing module 306 can interrupt processing for reading a document and processing for generating an image.

The PDL input processing module 307 performs processing for analyzing PDL data received via the network processing module 302 and rendering the data into bitmap image data for each page according to an instruction from the job control module 303. The bit map image data thus rendered is stored in a storage region by the storing module 305. In addition, when an interrupt instruction, which will be described later, is received from the job control module 303, the PDL input processing module 307 can interrupt PDL analysis processing and image generation processing.

The output processing module 308 performs processing for performing appropriate image processing on image data generated by each of the input processing modules and performing printing on a printing medium by controlling the image processing module 304, the printer processing unit 213, and the printer 214 according to an instruction from the job control module 303. The output processing module 308 also obtains status information of the printer processing unit 213 and the printer 214 and notifies the job control module 303 of the status information.

A remote monitoring service processing module 309 monitors operating information of the scanner 212 and the printer 214 via the scan input processing module 306 and the output processing module 308 and instructs as necessary the network processing module 302 to transmit the operating information to the management server 108. The remote monitoring service processing module 309 may also transmit the operating information according to an instruction from the UI processing module 301 or a remote monitoring I/F 310. The remote monitoring I/F 310 receives and processes an instruction related to remote monitoring from the management client 101 via the network processing module 302. Then, according to content of that instruction, the remote monitoring I/F 310 issues an instruction for storing data to the storing module 305 or an instruction for transmitting information to the remote monitoring service processing module 309.

FIG. 4A is a block diagram for describing a hardware configuration of the management client 101 according to the first embodiment.

A communication interface unit 401 is a network interface for communicating with an external system and an external apparatus and the like. A storage 402 stores an operating system (OS), various kinds of data, and the like. The various kinds of data, for example, are collected from an internal program and the operating information as well as from an external system and an external apparatus and the like. A CPU 403 executes a program by deploying the program from the storage 402 in a memory 404. That is, the memory 404 is used as a working memory of the CPU 403. An input I/F unit 405 is connected to a keyboard, a pointing device, and the like and receives operation input from the user. An output I/F unit 406 is connected to an output apparatus, such as a display device, and performs output of a result of execution of the program, and the like.

FIG. 4B is a functional block diagram describing a software configuration of the management client 101 according to the first embodiment.

A device management module 410 obtains and changes proxy setting information of the image forming apparatuses 102 to 104. The device management module 410 also performs processing for starting/stopping a remote monitoring function included in the image forming apparatuses 102 to 104, and the like. A proxy server 411 relays data communication between each of the image forming apparatuses 102 to 104 and the management server 108. In addition to the proxy server 411, another proxy server may be provided in a communication path between each of the image forming apparatuses 102 to 104 and the management server 108.

FIG. 5A is a conceptual diagram of a table for managing web services provided to devices on the LAN 105 by the image forming apparatus 102 according to the first embodiment. Actually, information corresponding to this is stored by the storing module 305 (FIG. 3). In the processing at the time of activation of the image forming apparatus 102, which will be described later, each of the processing modules to be providing a web service adds a service to this table, and the network processing module 302 then provides a web service for devices on the LAN 105.

In FIG. 5A, a remote UI service and a remote monitoring service are registered as examples; however, another service can be registered as well. A web service is provided according to conventional HTTP (including HTTPS) and can be used by accessing a URL containing an IP address of the image forming apparatus 102. A service name column 501 indicates a name of a registered web service. A service status column 502 indicates an enabled/disabled status of a registered web service. The service status can be changed at any timing on the processing module side by which the web service has been added. A service path column 503 indicates a character string to be appended to a URL for a device on the LAN 105 to specify a web service to be used. For example, if the remote UI service is to be used, "http://{IP address of image forming apparatus}" is specified and if the remote monitoring service is to be used, "http://{IP address of image forming apparatus}/remote_monitor" is specified. Depending on the service, a function path table illustrated in FIG. 5B may be included for each of the functions to be provided. In this case, it is necessary to further specify a function path following a service path. A service notifying destination column 504 indicates an address of a function of a program in the image forming apparatus 102, which is a notification destination for when making a request for processing from the network processing module 302 to a registration source of a service when the service is accessed.

FIG. 5B is a conceptual diagram of a table for managing functions provided by the remote monitoring I/F 310 in a web service. Actually, corresponding information is stored by the storing module 305 and is used in processing for setting a proxy dedicated to the remote monitoring service, which will be described later.

A function column 510 indicates a function provided by the remote monitoring I/F 310 as a web service. A function path column 511 indicates a character string to be appended to a URL for a device on the LAN 105 to specify a function of the remote monitoring service to be used. For example, if a proxy setting function is to be used, "http://{IP address of image forming apparatus}/remote_monitor/setting_proxy" is specified, and if an activation function is to be used, "http://{IP address of image forming apparatus}/remote_monitor/activate" is specified. A method column 512 indicates an HTTP method supported by the function. Here, even if the URL is correct, if the HTTP method is not supported, the function will not work.

Figure 6:
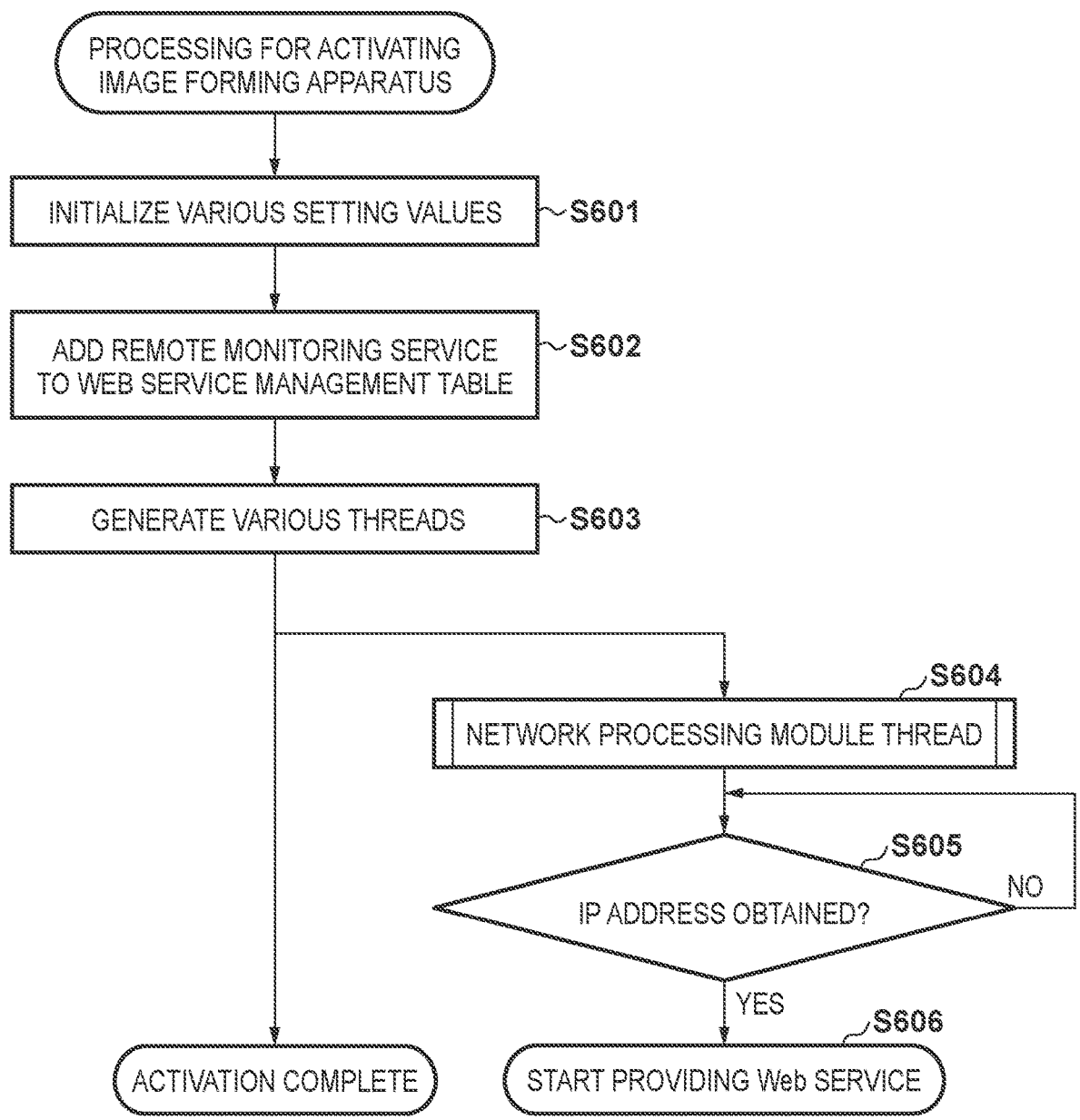
FIG. 6 is a flowchart for explaining processing for activating the image forming apparatus according to the first embodiment.

FIG. 6 is a flowchart for explaining processing for activating the image forming apparatus 102 according to the first embodiment. The processing indicated in this flowchart is realized, for example, by the CPU 201 executing a program stored in the ROM 203 or the HDD 204 by deploying the program in the RAM 202.

First, in step S601, the CPU 201 initializes various setting values. Next, the processing proceeds to step S602, and the CPU 201 adds the remote monitoring service to the web service management table illustrated in FIG. 5A. Although other web services are also added at this timing, the descriptions thereof are omitted, because they are not related to the present invention. Next, the processing proceeds to step S603, and the CPU 201 generates various threads. This makes it possible for each of the processing modules illustrated in FIG. 3 to operate in parallel. This enables the user to thereafter sequentially use the functions provided by the processing modules starting from those that are ready. The activation of the image forming apparatus 102 is thus completed here, and only the preparation of the network processing module 302, which is particularly related, will be described in the framework of the flowchart of activation.

When the thread of the network processing module 302 is generated in step S604, the processing proceeds to step S605, and the CPU 201 functions as the network processing module 302 and determines whether an IP address of the image forming apparatus 102 has been obtained. When it is determined that an IP address has been obtained, the processing proceeds to step S606, and the network processing module 302 starts provision of a web service. Meanwhile, when it is determined that an IP address has not been obtained, the processing returns to step S605. As described above, among the functions provided by the image forming apparatus 102, those related to the network cannot be used until an IP address is obtained.

A web service can be provided by the above-described processing when the preparation is complete, after the image forming apparatus 102 is activated.

Figure 7:
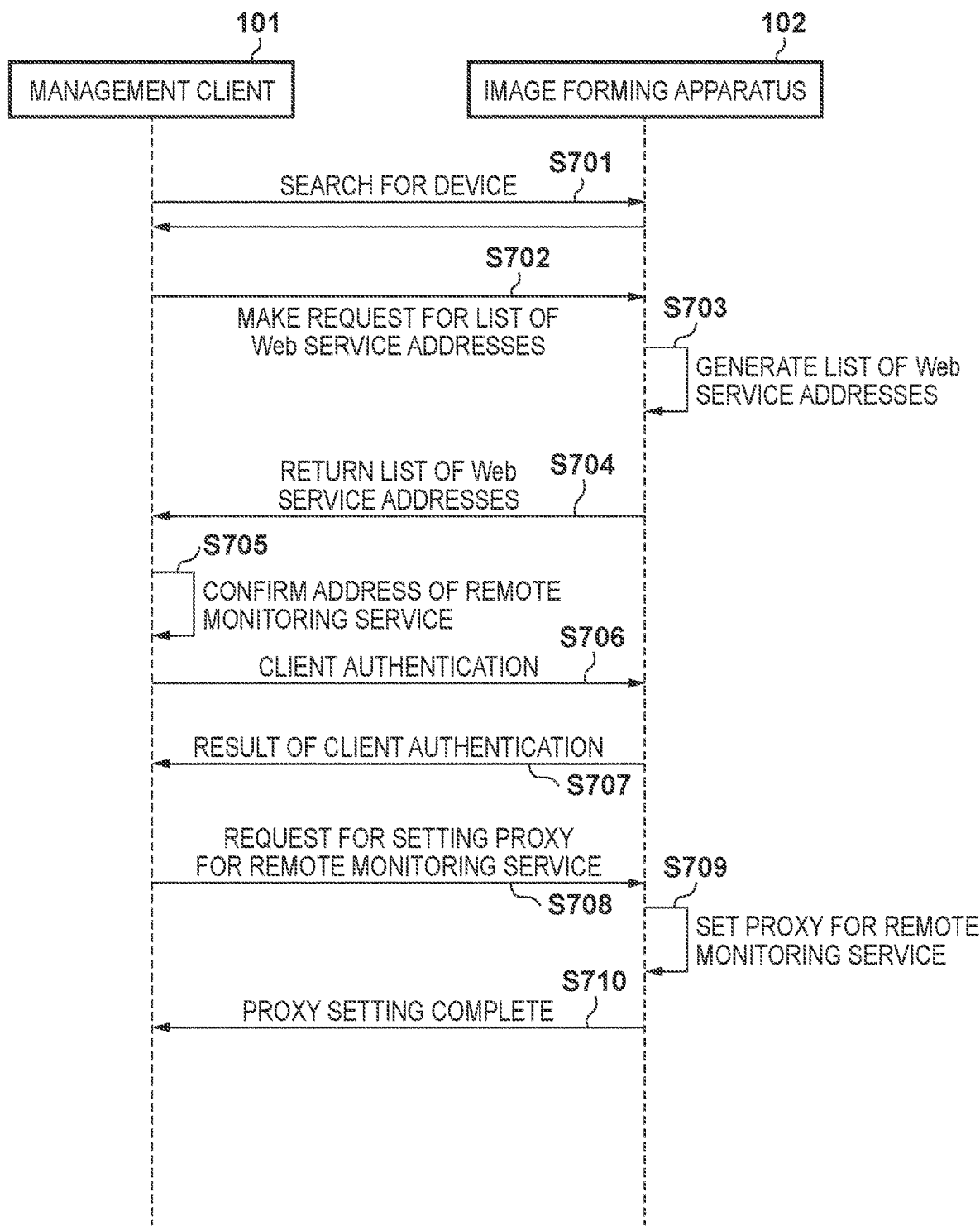
FIG. 7 is a sequence diagram for when the management client according to the first embodiment sets a proxy dedicated to a remote monitoring service in the image forming apparatus.

FIG. 7 is a sequence diagram for when the management client 101 according to the first embodiment sets a proxy dedicated to the remote monitoring service in the image forming apparatus 102. Communication between the management client 101 and each of image forming apparatuses in this sequence diagram is performed according to HTTP (including HTTPS).

First, in step S701, the management client 101 searches for an image forming apparatus on the LAN 105. In the example of FIG. 7, only the image forming apparatus 102 is illustrated; however, actually, the image forming apparatuses 103 and 104 are also found at this time. The found image forming apparatuses are added to a device management table of FIG. 10, which will be described later.

Next, in step S702, the management client 101 makes a request for a list of web service addresses from the found image forming apparatus 102. Thus, in step S703, the image forming apparatus 102 generates a list of web service addresses based on the web service management table illustrated in FIG. 5A. This list of web service addresses is a list of combinations of a name of each of the services and an access URL ("http://{IP address of image forming apparatus}/remote_monitor" for the remote monitoring service) registered in the web service management table. Then, in step S704, the image forming apparatus 102 returns the generated list of web service addresses to the management client 101.

Thus, in step S705, the management client 101 confirms whether the remote monitoring service is present in the list of web service addresses received from the image forming apparatus 102. The management client 101 can thus determine whether the image forming apparatus 102 supports the remote monitoring service. When it is determined that the image forming apparatus 102 supports the remote monitoring service, in step S706, the management client 101 performs client authentication of the image forming apparatus 102. Regarding the client authentication, any method that accords with the embodiment may be taken.

Next, in step S707, the image forming apparatus 102 returns a result of the client authentication to the management client 101. When the authentication is unsuccessful, the following steps are not performed. When the authentication is successful, in step S708, the management client 101 accesses "http://{IP address of image forming apparatus}/remote_monitor/setting_proxy" to use a proxy setting function of the remote monitoring service. At this time, PUT is specified as the HTTP method and the information that the management client 101, as a proxy, sets, such as its IP address and host name, is added as a parameter. Regarding a method of specifying the parameter, any method that accords with the embodiment may be taken. This includes, for example, a method of passing the parameter in a query string of a URL or the body of an HTTP request. In addition, if DELETE is specified as the HTTP method and no parameter is added, a request will be for deleting a setting of a proxy dedicated to the remote monitoring service.

Thus, in step S709, the image forming apparatus 102 stores the transmitted proxy information as information of a proxy dedicated to the remote monitoring service, or if DELETE is specified, the image forming apparatus 102 deletes stored information of a proxy dedicated to the remote monitoring service. Details of the processing will be described later. In step S710, the image forming apparatus 102 returns that setting of a proxy to the management client 101 completed.

The processing makes it possible for the management client 101 to set a proxy dedicated to the remote monitoring service to the image forming apparatus found on the LAN 105.

Figure 8:
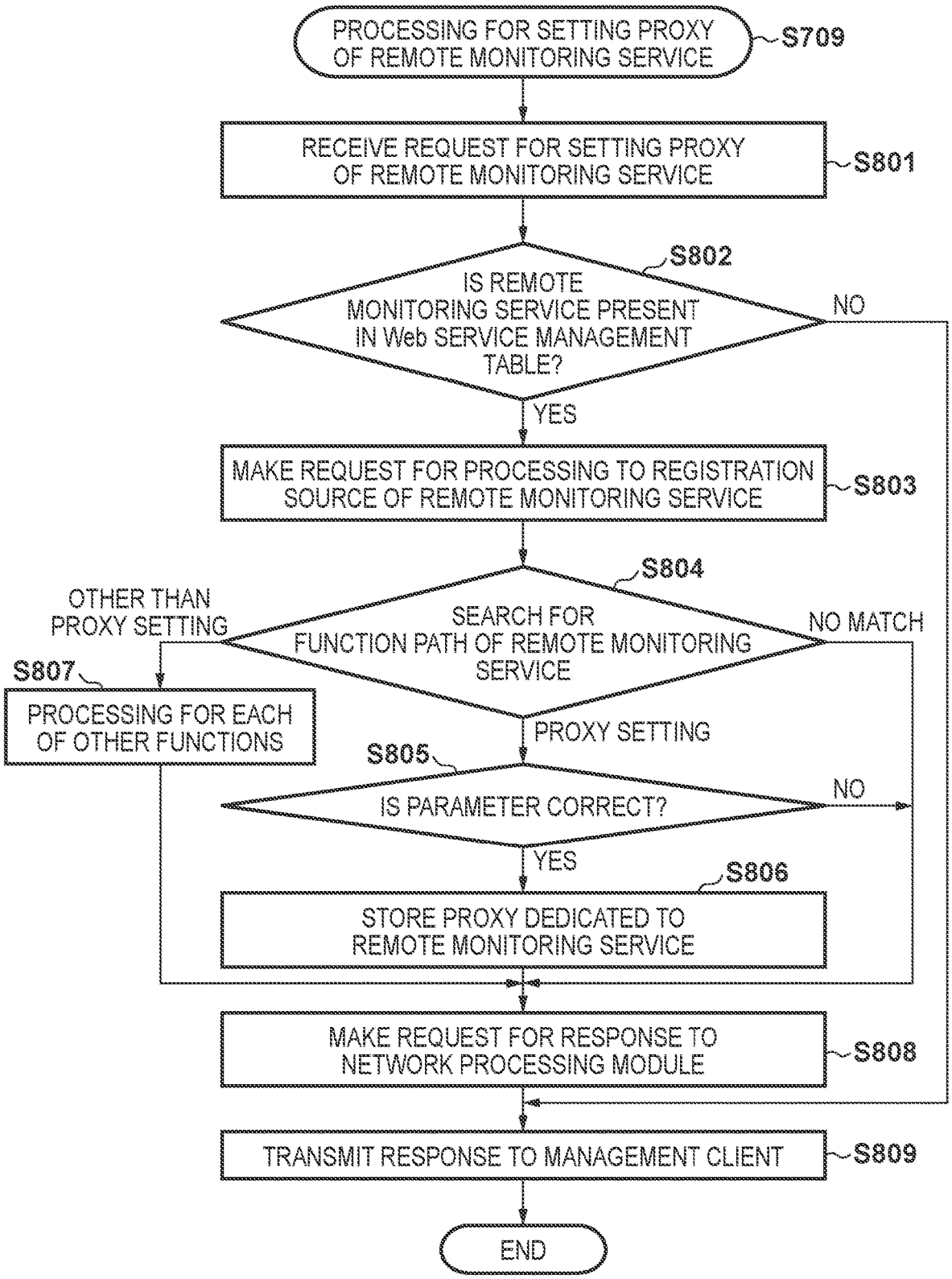
FIG. 8 is a flowchart for explaining processing for setting a proxy dedicated to the remote monitoring service in the image forming apparatus according to the first embodiment.

FIG. 8 is a flowchart for explaining processing (step S709 of FIG. 7) for setting a proxy dedicated to the remote monitoring service in the image forming apparatus 102 according to the first embodiment. The processing indicated in this flowchart is realized, for example, by the CPU 201 executing a program stored in the ROM 203 or the HDD 204 by deploying the program in the RAM 202.

First, in step S801, the CPU 201 functions as the network processing module 302 and receives a request for setting a proxy dedicated to the remote monitoring service from the management client 101 transmitted in step S708. Next, the processing proceeds to step S802, and the CPU 201 functions as the network processing module 302, extracts a service path from an accessed URL, and searches for the web service management table (FIG. 5A). Here, if there is a service path that matches with that of the remote monitoring service among those of the registered web services, the processing proceeds to step S803; otherwise, the processing proceeds to step S809. In step S803, the CPU 201 functions as the network processing module 302 and makes a request for processing to a notification destination of the service with whose service path the service path matches. Here, the request is a request for setting a proxy of the remote monitoring service, and so the request for processing is made to the remote monitoring I/F 310.

In step S804, the CPU 201 functions as the remote monitoring I/F 310, extracts a function path from an accessed URL, and performs a search in the remote monitoring service function path table illustrated in FIG. 5B. Here, if the function path matches with that of a proxy setting in step S804, the processing proceeds to step S805; if the function path matches with any of those of other functions, the processing proceeds to step S807; and if the function path does not match with any of the function paths, the processing proceeds to step S808. In step S805, the CPU 201 functions as the remote monitoring I/F 310 and determines whether a parameter including an HTTP method received from the management client 101 is correct. Here, if it is correct, the processing proceeds to step S806, and if it is incorrect, the processing proceeds to step S808. In step S806, the remote monitoring I/F 310 stores received proxy information in a region for information of a proxy dedicated to the remote monitoring service by the storing module 305 and the processing proceeds to step S808. When the HTTP method is DELETE, stored information of a proxy dedicated to the remote monitoring service is deleted in step S806, and the processing proceeds to step S808. Meanwhile, in step S807, the remote monitoring I/F 310 performs processing corresponding to the function for which a search has been performed in step 804; however, a description thereof will be omitted here.

In step S808, the remote monitoring I/F 310 makes a request to the network processing module 302 to return a result of the processing to the management client 101. Thus, in step S809, the CPU 201 functions as the network processing module 302 and returns a result of the processing to the management client 101.

The above-described processing makes it possible for the management client 101 to set a proxy for when performing communication with the image forming apparatus 102 using the remote monitoring service. It is also possible to delete a registered proxy for the remote monitoring service.

Figure 9:
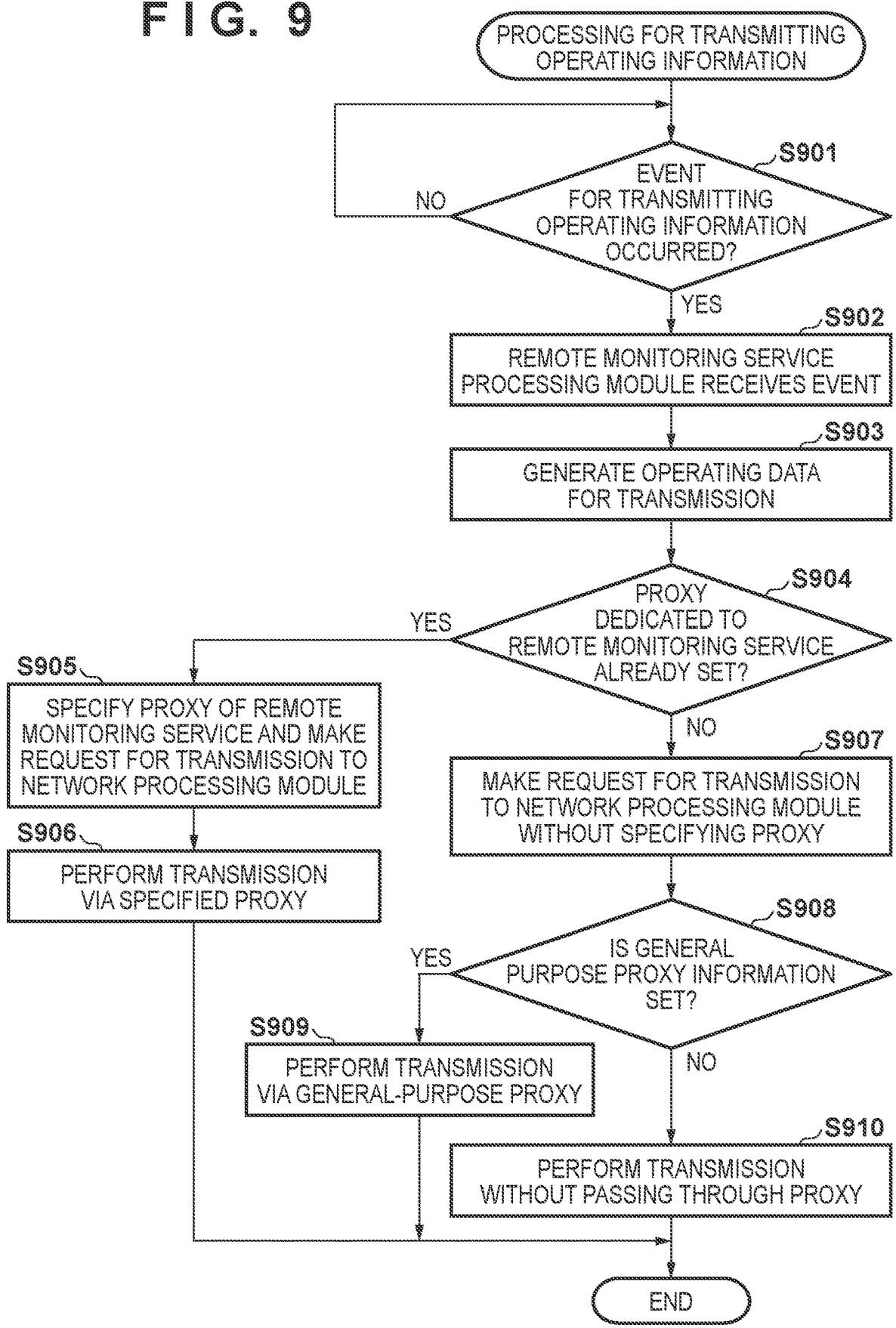
FIG. 9 is a flowchart for explaining processing for when the image forming apparatus according to the first embodiment performs communication in the remote monitoring service.

FIG. 9 is a flowchart for explaining processing for when the image forming apparatus 102 according to the first embodiment performs communication (transmission of operating information to the management server 108) in the remote monitoring service. The processing indicated in this flowchart is realized, for example, by the CPU 201 executing a program stored in the ROM 203 or the HDD 204 by deploying the program in the RAM 202.

First, in step S901, it is determined whether an event that triggers transmission of operating information occurs in the image forming apparatus 102, and when the event occurs, the processing proceeds to step S902 and when the event does not occur, the processing waits in step S901. The event in which operating information is transmitted is caused, for example, by detection of a failure of the scanner 212 or the printer 214 by a self-monitoring function included in the image forming apparatus 102 or by detection of a scheduled transmission time and the like. In step S902, the CPU 201 functions as the remote monitoring service processing module 309 and receives an operating information transmission event. Next, the processing proceeds to step S903, and the CPU 201 functions as the remote monitoring service processing module 309 and generates operating data to be transmitted to the management server 108 based on the received operating information transmission event.

Next, the processing proceeds to step S904, and the CPU 201 functions as the remote monitoring service processing module 309, reads the region for information of a proxy dedicated to the remote monitoring service via the storing module 305, and determines whether a proxy dedicated to the remote monitoring service is set. Here, if the proxy dedicated to the remote monitoring service is set, the processing proceeds to step S905, and if the proxy dedicated to the remote monitoring service is not set, the processing proceeds to step S907. In step S905, the CPU 201 functions as the remote monitoring service processing module 309 and makes a request to the network processing module 302 to transmit the operating data. At this time, information of the proxy dedicated to the remote monitoring service is specified in a parameter. Then, the processing proceeds to step S906, and the CPU 201 functions as the network processing module 302, transmits the operating data so as to pass through the proxy specified by the parameter, and ends the processing.

Meanwhile, in step S907, the CPU 201 functions as the remote monitoring service processing module 309 and makes a request to the network processing module 302 to transmit the operating data. At this time, proxy information is not specified in a parameter. Then, the processing proceeds to step S908, and the CPU 201 functions as the network processing module 302, reads the region of information of a general-purpose proxy via the storing module 305, and determines whether a general-purpose proxy is set. Here, if the general-purpose proxy is set, the processing proceeds to step S909, and if the general-purpose proxy is not set, the processing proceeds to step S910. In step S909, the CPU 201 functions as the network processing module 302, transmits the operating data via the general-purpose proxy, and ends the processing. Meanwhile, in step S910, the CPU 201 functions as the network processing module 302, transmits the operating data without particularly passing through a proxy, and ends the processing.

As described above, according to the first embodiment, when performing communication using the remote monitoring service, the image forming apparatus 102 can perform communication by switching proxies to pass through according to settings.

The first embodiment is not limited to the remote monitoring function. For example, when it is desired that a function for transmitting data read by the image forming apparatus to an external cloud service passes through a dedicated proxy, it becomes possible to do so by providing a region for information of a proxy dedicated for each function and a web service for setting a proxy and setting a proxy from the management client, similarly to the first embodiment.

Second Embodiment

A second embodiment of the present invention will be described. In the second embodiment, a case where an image forming apparatus is not found due to the power of the image forming apparatus not being turned on or the like when the management client 101 searches for an image forming apparatus on the LAN 105 in step S701 and an image forming apparatus is later connected to the LAN 105 will be described. Since a configuration of a system and hardware configurations and the like of an image forming apparatus and the management client 101 according to the second embodiment are similar to those of the above-described first embodiment, the descriptions thereof will be omitted.

Figures 10, 11:
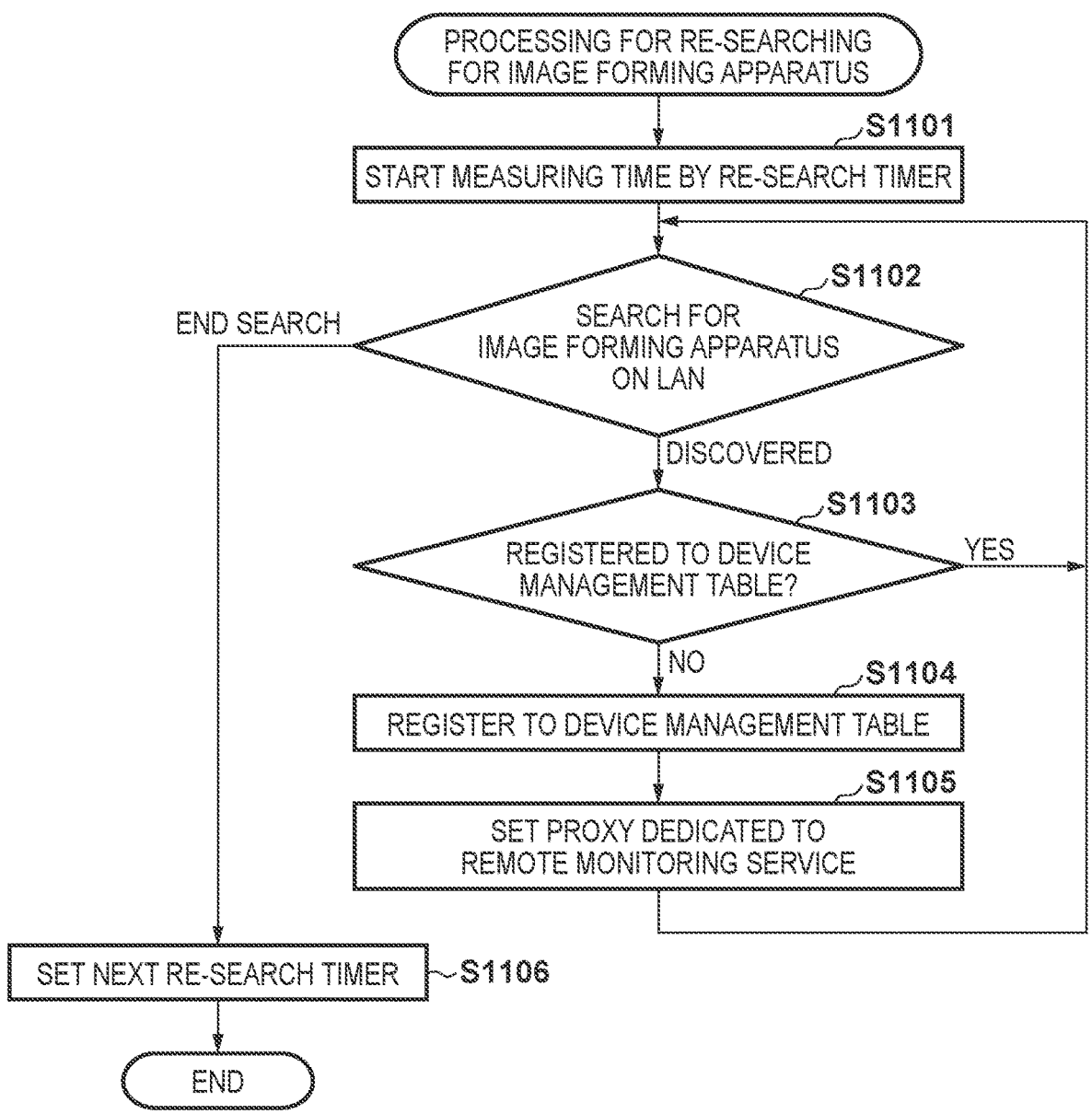
FIG. 10 is a conceptual diagram of a table for the management client according to a second embodiment to manage network devices.
FIG. 11 is a flowchart for explaining processing for when the management client according to the second embodiment re-searches for an image forming apparatus.

FIG. 10 is a conceptual diagram of a table for the management client 101 according to the second embodiment to manage network devices. Actually, information corresponding to this is stored by the storage 402.

A device ID column 1001 indicates an ID allocated when an image forming apparatus found in a search is added to the device management table. A serial number column 1002 indicates a serial number allocated at the time an image forming apparatus is manufactured. An IP address column 1003 indicates an IP address allocated for identifying a device in the LAN 105.

FIG. 11 is a flowchart for explaining processing for when the management client 101 according to the second embodiment re-searches for an image forming apparatus. The processing indicated in this flowchart is realized, for example, by the CPU 403 of the management client 101 executing a program stored in the storage 402 in the memory 404 by deploying the program.

In step S1101, the CPU 403 starts measuring time by a re-search timer. Next, the processing proceeds to step S1102, and the CPU 403 searches for an image forming apparatus on the LAN 105. Here, if an image forming apparatus is discovered, the processing proceeds to step S1103, and if the time measured by the re-search timer exceeds a predetermined time, the search is terminated, and the processing proceeds to step S1106. In step S1103, the CPU 403 determines whether the found image forming apparatus is registered in the device management table of FIG. 10 based on a serial number of the image forming apparatus. Here, if it is determined that the found image forming apparatus is registered, the processing returns to step S1102, and a next search for an image forming apparatus is performed. Meanwhile, if the found image forming apparatus is not registered, the processing proceeds to step S1104. In step S1104, the CPU 403 registers information of the found image forming apparatus to be added in the device management table (FIG. 10) and the processing proceeds to step S1105. In step S1105, the CPU 403 performs processing for setting a proxy dedicated to the remote monitoring service in the found image forming apparatus as illustrated in FIG. 7. Then, the processing returns to step S1102, and a next search for an image forming apparatus is performed. In step S1106, the CPU 403 set the timer for a next re-search to any interval and terminates the processing.

As described above, according to the second embodiment, the management client 101 can set a proxy dedicated to the remote monitoring service for a newly discovered image forming apparatus regardless of a timing at which the image forming apparatus is connected to the LAN 105.

Third Embodiment

A third embodiment of the present invention will be described. In the third embodiment, an example in which the management client 101 is not present on the LAN 105 and one (assumed to be the image forming apparatus 102 here) of a plurality of image forming apparatuses operates as a proxy server similarly to the management client 101 will be described. Since a configuration of a system and hardware configurations and the like of an image forming apparatus according to the third embodiment are similar to those of the above-described first embodiment, the descriptions thereof will be omitted.

Figure 12:
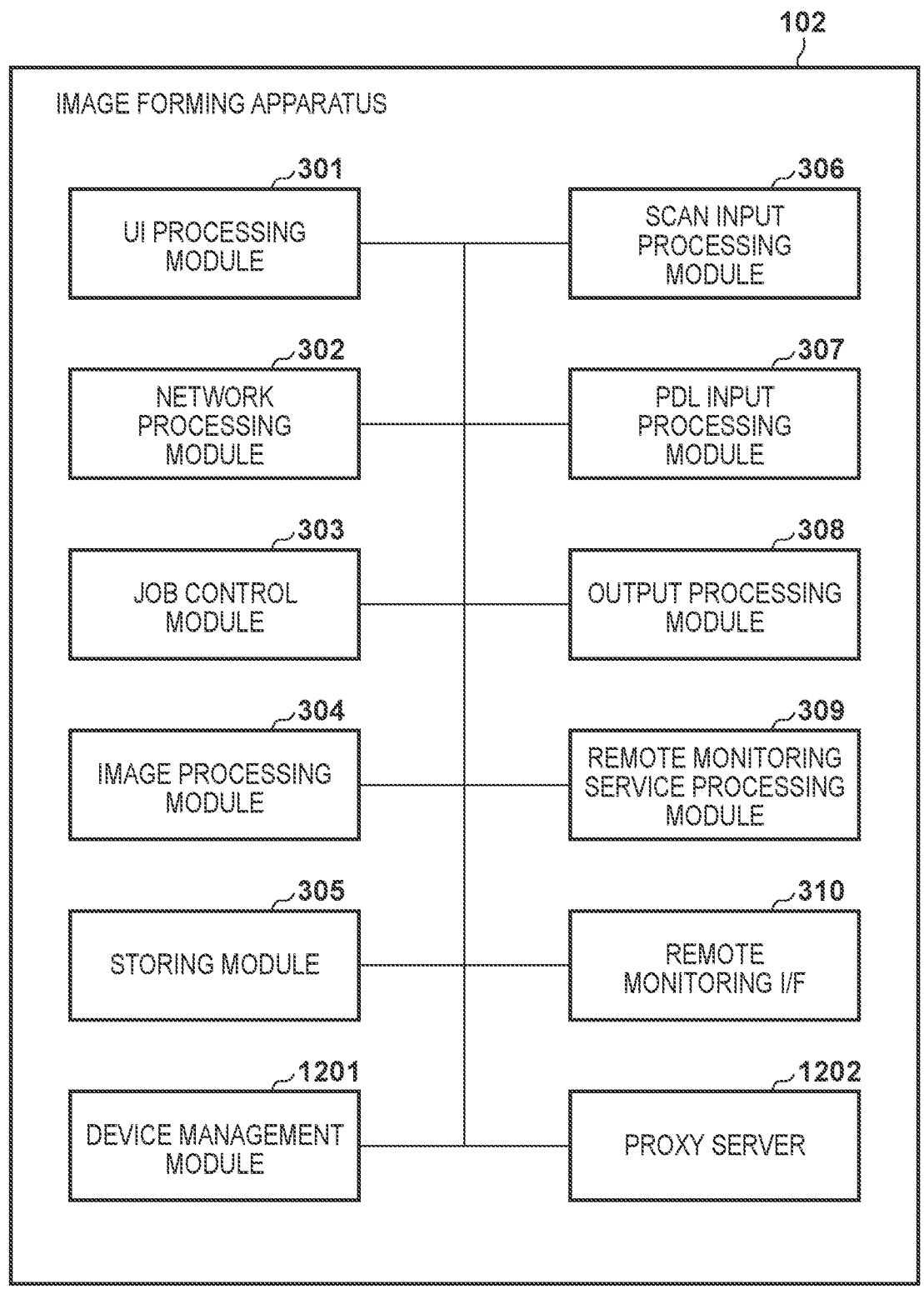
FIG. 12 is a functional block diagram for describing software modules of the image forming apparatus according to a third embodiment.

FIG. 12 is a functional block diagram for describing software modules of the image forming apparatus 102 according to the third embodiment. Each of the modules illustrated in FIG. 12 are realized by the CPU 201 executing a program. Further, in FIG. 12, parts in common with FIG. 3 according to the above-described first embodiment are denoted by the same reference numerals, and their description will be omitted.

A device management module 1201 obtains and changes proxy setting information of other image forming apparatuses 103 and 104. The device management module 1201 also performs processing for starting/stopping a remote monitoring service function included in the image forming apparatuses 103 and 104, and the like. In addition, the device management table illustrated in FIG. 10 is stored in the HDD 204 of the image forming apparatus 102.

A proxy server 1202 relays data communication between the image forming apparatuses 103 and 104 and the management server 108. In addition to the proxy server 1202, another proxy server may be provided in a communication path between the image forming apparatuses 103 and 104 and the management server 108.

Figure 13:
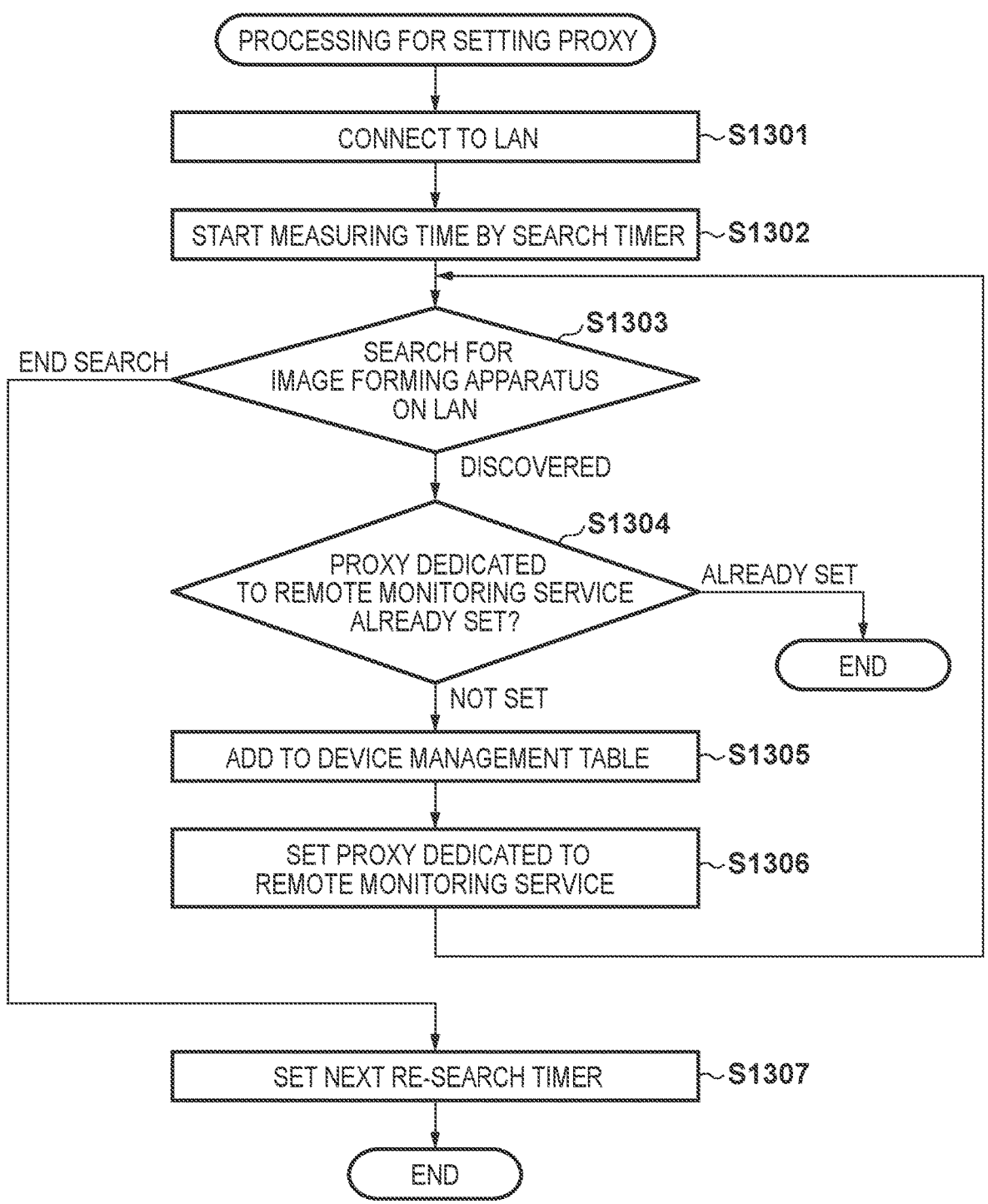
FIG. 13 is a flowchart for explaining proxy setting processing to be performed by an image forming apparatus 102 on image forming apparatuses 103 and 104 according to the third embodiment.

FIG. 13 is a flowchart for explaining proxy setting processing to be performed by the image forming apparatus 102 on the image forming apparatuses 103 and 104 according to the third embodiment. The processing indicated in this flowchart is realized, for example, by the CPU 201 of the image forming apparatus 102 executing a program stored in the ROM 203 or the HDD 204 by deploying the program in the RAM 202.

The processing is started by the image forming apparatus 102 being connected to the LAN 105 in step S1301. Next, the processing proceeds to step S1302, and a timer for a search starts measuring time. Next, the processing proceeds to step S1303, and the CPU 201 functions as the device management module 1201 and searches for another image forming apparatus on the LAN 105. Here, if another image forming apparatus is discovered in step S1303, the processing proceeds to step S1304, and if the search is terminated due to the time measured by the timer exceeding a predetermined time, the processing proceeds to step S1307. In step S1304, the CPU 201 functions as the device management module 1201, obtains a setting of a proxy dedicated to the remote monitoring service of the discovered image forming apparatus, and determines whether a proxy has already been set. If it is determined that the proxy has already been set, since any one of other image forming apparatuses 103 and 104 has been already operating as a proxy and the proxy will be set in the image forming apparatus 102 when that image forming apparatus performs a search again, the processing is terminated.

Meanwhile, if the proxy has not been set, the processing proceeds to step S1305. In step S1305, the CPU 201 of the image forming apparatus 102 functions as the device management module 1201 and adds the found image forming apparatus to the device management table. Then, the processing proceeds to step S1306, and the CPU 201 performs processing for setting a proxy dedicated to the remote monitoring service illustrated in FIG. 7 for the found image forming apparatus. Then, the processing returns to step S1303, and a next search for an image forming apparatus is performed.

In step S1307, the CPU 201 functions as the device management module 1201 and sets a next re-search timer to a particular interval. At this time, by writing an IP address or the like of the image forming apparatus 102 in the region for information of a proxy dedicated to the remote monitoring service in the image forming apparatus 102, when a search is performed by another image forming apparatus, it is determined that a proxy has already been set.

As described above, according to the third embodiment, a specific image forming apparatus can be set and used as a proxy for remote monitoring communication without installing a management client.

Configurations of Screens in Common from First to Third Embodiments

FIG. 14A is a diagram illustrating an example of a remote monitoring service setting screen of the image forming apparatus 102 according to an embodiment.

A registering status 1401 indicates whether the remote monitoring service has been registered. Here, by the user touching the registering status 1401, if the service is not registered, the screen transitions to a screen for executing registration (not illustrated), and if the service has been registered, the screen transitions to a screen for executing registration cancellation (not illustrated). A web service setting 1402 indicates whether a web service of the remote monitoring service is provided. The status of the remote monitoring service in the service status column 502 of the above-described FIG. 5A is switched over according to this setting.

FIG. 14B is a diagram illustrating an example of a device management screen of the management client 101 according to the third embodiment.

A serial number column 1410 indicates a serial number obtained from an image forming apparatus. An IP address column 1411 indicates an IP address obtained from an image forming apparatus. A registering status column 1412 indicates a registering status of a remote monitoring service setting obtained from an image forming apparatus. A proxy setting column 1413 indicates a setting status of a proxy dedicated to the remote monitoring service obtained from the image forming apparatus. A batch proxy setting button 1404 is used for when setting a proxy to a plurality of image forming apparatuses on the LAN 105 at once. This button 1404 is also used for when changing a setting for the image forming apparatus for which a proxy has already been set. It is also possible to wait for a proxy to be automatically set by the second embodiment to an image forming apparatus for which a proxy has not been set. A batch registration button 1405 is used for when registering the remote monitoring service to a plurality of image forming apparatuses on the LAN 105 at once.

Figure 15:
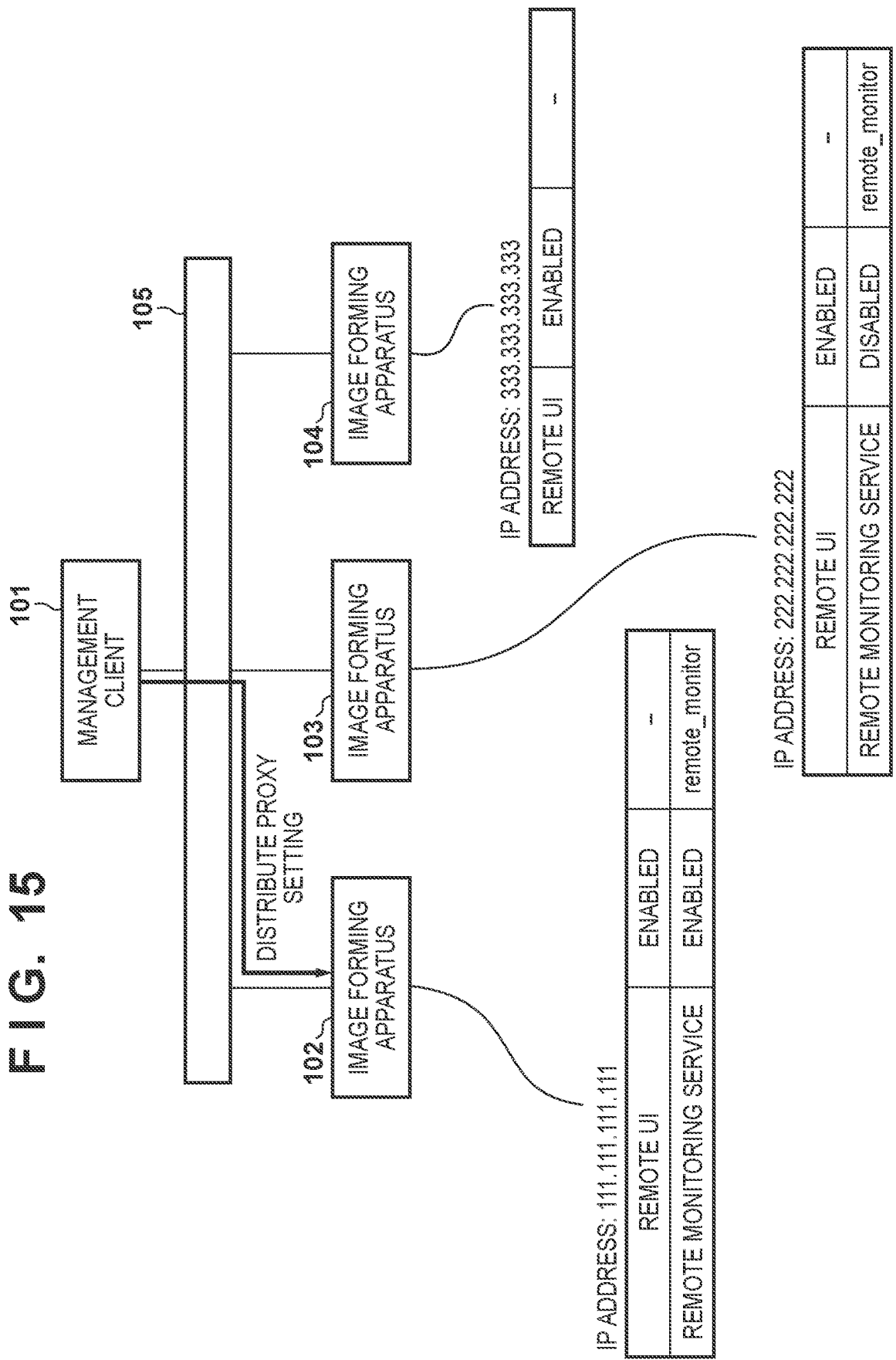
FIG. 15 is a conceptual diagram for when a setting of a proxy dedicated to the remote monitoring service is distributed from the management client to image forming apparatuses on a LAN in an embodiment.

FIG. 15 is a conceptual diagram for when a setting of a proxy dedicated to the remote monitoring service is distributed from the management client 101 to image forming apparatuses on the LAN 105 in an embodiment.

Each of the image forming apparatuses provides a web service, and the management client 101 collects information as to whether an image forming apparatus supports the remote monitoring service or whether the service status is enabled and sets a proxy in a target image forming apparatus by the processing of FIG. 7.

In the example of FIG. 15, the remote monitoring service is set in the image forming apparatus 102 and the service status is enabled, and so, a proxy dedicated to the remote monitoring service is set in the image forming apparatus 102 by the management client 101. Regarding the image forming apparatus 103, the remote monitoring service is set but the remote monitoring service status is disabled, and so a proxy dedicated to the remote monitoring service is not set. Regarding the image forming apparatus 104, the remote monitoring service is not set, and so a proxy dedicated to the remote monitoring service is not set.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-77178, filed May 9, 2022, which is hereby incorporated by reference herein in its entirety.

What is claimed is:

1. An information processing system including an image forming apparatus provided with an output function for outputting operating information to a management server and an information processing apparatus capable of operating as a proxy of the output function, the image forming apparatus comprising:
one or more first memories storing instructions; and
one or more first processors that execute the instructions to:
provide a predetermined web service;
accept a request for setting the proxy of the output function via the predetermined web service;
store a setting of the proxy that is included in the accepted request;
in a case that an event for transmitting the operating information occurs, transmit the operating information to the management server via the proxy based on the stored setting of the proxy;
register information including a name of the predetermined web service, a status indicating whether the predetermined web service is enabled or disabled, and a path for specifying the predetermined web service, wherein the request for setting the proxy includes the path corresponding to the predetermined web service and a path for setting the proxy, and
the information processing apparatus comprising:
one or more second memories storing instructions; and
one or more second processors that execute the instructions to:
transmit a request for setting a proxy for making use of the information processing apparatus as a proxy for the output function to the image forming apparatus providing the predetermined web service among apparatuses on a network.

2. The information processing system according to claim 1, wherein the request for setting the proxy further includes an IP address of the image forming apparatus.

3. The information processing system according to claim 1, wherein the event for transmission occurs based on a detection by a self-monitoring function included in the image forming apparatus.

4. The information processing system according to claim 1, wherein the one or more first processors further execute the instructions to: in the storing of the setting of the proxy, store the setting of the proxy included in the request, in response to authentication of the information processing apparatus being successful.

5. The information processing system according to claim 1, wherein the one or more first processors further execute the instructions to:
in the transmission of the operating information,
determine that there is no stored setting of the proxy and there is a general-purpose proxy; and
based on the determining, perform the transmission via that general-purpose proxy,
wherein the general-purpose proxy is not a proxy dedicated to a remote monitoring service.

6. The information processing system according to claim 1, wherein the one or more second processors further execute the instructions to:
search for one or more image forming apparatuses connected via a network;
obtain information of a web service provided by the one or more image forming apparatuses found in the search;
determine that the obtained information of the web service includes the predetermined web service; and
based on the determining, transmit the request for setting the proxy of the predetermined web service to the image forming apparatus.

7. The information processing system according to claim 6, wherein the one or more second processors further execute the instructions to:
register at once the predetermined web service to the one or more image forming apparatuses found in the search.

8. The information processing system according to claim 6, wherein the one or more second processors further execute the instructions to:
transmit at once a request for setting the proxy to the one or more image forming apparatuses found in the search.

9. An information processing system including a plurality of image forming apparatuses provided with an output function for outputting operating information to a management server,
a first image forming apparatus of the plurality of image forming apparatuses comprising:
one or more memories storing instructions; and
one or more processors that execute the instructions to:
provide a predetermined web service;
accept a request for setting a proxy of the output function via the predetermined web service;
store a setting of the proxy that is included in the accepted request;
in a case that an event for transmitting the operating information occurs, transmit the operating information to the management server via the proxy based on the stored setting of the proxy;
register information including a name of the predetermined web service, a status indicating whether the predetermined web service is enabled or disabled, and a path for specifying the predetermined web service; and
transmit a request for setting a proxy for making use of the first image forming apparatus as a proxy of the output function to a second image forming apparatus of the plurality of image forming apparatuses,
wherein the request for setting the proxy includes the path corresponding to the predetermined web service and a path for setting the proxy.

10. An image forming apparatus provided with an output function for outputting operating information to a management server, the apparatus comprising:
one or more memories storing instructions; and
one or more processors that execute the instructions to:
provide a predetermined web service;
accept a request for setting a proxy of the output function via the predetermined web service;
store a setting of the proxy that is included in the accepted request;
in a case that an event for transmitting the operating information occurs, transmit the operating information to the management server via the proxy based on the stored setting of the proxy;
register information including a name of the predetermined web service, a status indicating whether the predetermined web service is enabled or disabled, and a path for specifying the predetermined web service; and
transmit the operating information to the management server via the proxy of the output function set in the setting of the proxy in response to an event for transmitting the operating information,
wherein the request for setting the proxy includes the path corresponding to the predetermined web service and a path for setting the proxy.

11. An image forming apparatus provided with an output function for outputting operating information to a management server, the apparatus comprising:
one or more memories storing instructions; and
one or more processors that execute the instructions to:
provide a predetermined web service;
accept a request for setting a proxy of the output function via the predetermined web service;
store a setting of the proxy that is included in the accepted request;
in a case that an event for transmitting the operating information occurs, transmit the operating information to the management server via the proxy based on the stored setting of the proxy;
register information including a name of the predetermined web service, a status indicating whether the predetermined web service is enabled or disabled, and a path for specifying the predetermined web service; and
transmit a request for setting a proxy for making use of the image forming apparatus as a proxy of the output function to a first image forming apparatus including the output function and connected via a network,
wherein the request for setting the proxy includes the path corresponding to the predetermined web service and a path for setting the proxy.

12. A method of controlling an image forming apparatus provided with an output function for outputting operating information to a management server, the method comprising:
providing a predetermined web service;
accepting a request for setting a proxy of the output function via the predetermined web service;
storing a setting of the proxy that is included in the accepted request;

in a case that an event for transmitting the operating information occurs, transmitting the operating information to the management server via the proxy based on the stored setting of the proxy;

registering information including a name of the predetermined web service, a status indicating whether the predetermined web service is enabled or disabled, and a path for specifying the predetermined web service; and transmitting the operating information to the management server via the proxy of the output function set in the setting of the proxy, in response to an event for transmitting the operating information, wherein the request for setting the proxy includes the path corresponding to the predetermined web service and a path for setting the proxy.

13. A method of controlling an image forming apparatus provided with an output function for outputting operating information to a management server, the method comprising:

providing a predetermined web service;

accepting a request for setting a proxy of the output function via the predetermined web service;

storing a setting of the proxy that is included in the accepted request;

in a case that an event for transmitting the operating information occurs, transmitting the operating information to the management server via the proxy based on the stored setting of the proxy;

registering information including a name of the predetermined web service, a status indicating whether the predetermined web service is enabled or disabled, and a path for specifying the predetermined web service; and transmitting a request for setting a proxy for making use of the image forming apparatus as a proxy of the output function to a first image forming apparatus including the output function and connected via a network, wherein the request for setting the proxy includes the path corresponding to the predetermined web service and a path for setting the proxy.

14. A non-transitory computer-readable storage medium storing a program for causing a processor to execute a method of controlling an image forming apparatus provided with an output function for outputting operating information to a management server, the method comprising:

providing a predetermined web service;

accepting a request for setting a proxy of the output function via the predetermined web service;

storing a setting of the proxy that is included in the accepted request;

in a case that an event for transmitting the operating information occurs, transmitting the operating information to the management server via the proxy based on the stored setting of the proxy;

registering information including a name of the predetermined web service, a status indicating whether the predetermined web service is enabled or disabled, and a path for specifying the predetermined web service; and transmitting the operating information to the management server via the proxy of the output function set in the setting of the proxy, in response to an event for transmitting the operating information, wherein the request for setting the proxy includes the path corresponding to the predetermined web service and a path for setting the proxy.

15. A non-transitory computer-readable storage medium storing a program for causing a processor to execute a method of controlling an image forming apparatus provided with an output function for outputting operating information to a management server, the method comprising:

providing a predetermined web service;

accepting a request for setting a proxy of the output function via the predetermined web service;

storing a setting of the proxy that is included in the accepted request;

in a case that an event for transmitting the operating information occurs, transmitting the operating information to the management server via the proxy based on the stored setting of the proxy;

registering information including a name of the predetermined web service, a status indicating whether the predetermined web service is enabled or disabled, and a path for specifying the predetermined web service; and transmitting a request for setting a proxy for making use of the image forming apparatus as a proxy of the output function to a first image forming apparatus including the output function and connected via a network, wherein the request for setting the proxy includes the path corresponding to the predetermined web service and a path for setting the proxy.

* * * * *